Figures 1, 2:
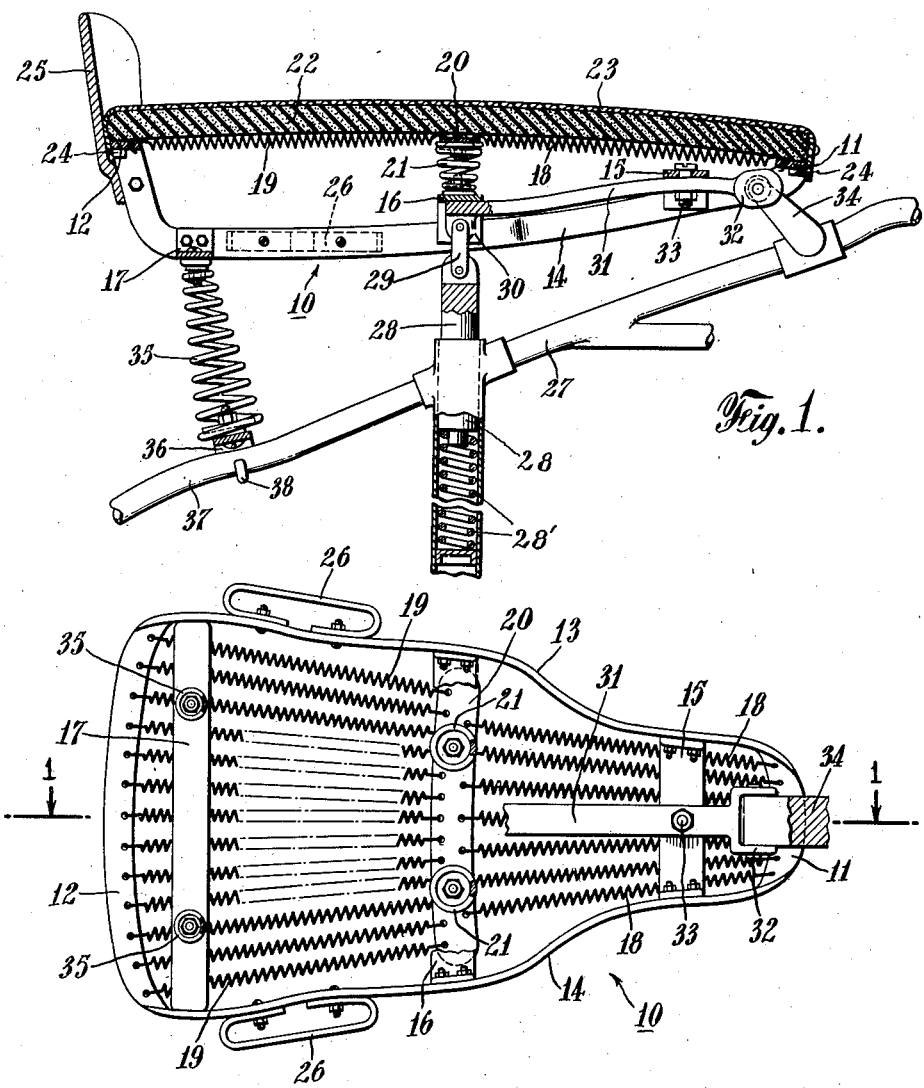

Oct. 5, 1943.        H. MESINGER        2,331,213
                      CYCLE SADDLE
                   Filed May 15, 1941

INVENTOR
HENRY MESINGER
BY
William J. Mesinger
ATTORNEY

Patented Oct. 5, 1943

2,331,213

UNITED STATES PATENT OFFICE 2,331,213

CYCLE SADDLE

Henry Mesinger, Mount Vernon, N. Y.

Application May 15, 1941, Serial No. 393,569

3 Claims. (Cl. 155—5.20)

This invention relates to saddles and more particularly to double seated saddles for motor cycles.

It is often desired to carry a passenger in tandem fashion in back of the driver of a motorcycle and for such purposes a tandem attachment or tandem seat has been mounted above the rear wheel of the motorcycle. This has disadvantages because the mud guard necessitates a relatively high seating position and a special attachment is required. When however, an enlarged or double seated saddle is employed and mounted in the usual saddle position, a separate attachment is not needed, and the balance of the loaded motorcycle is much improved. The driver and passenger can sit close together and both will react as a unit in response to the necessary balancing movements during driving. When riding alone the driver can choose at will either a forward or a rearward position as may be desired.

In a double seat however the springing arrangement must be properly responsive to react properly to three different conditions of weight distribution, first adequate comfort must be provided when the rider alone sits in the forward position; secondly the seat must provide adequate comfort when the rider alone sits in the rearward position; and thirdly the seat must provide proper riding qualities when both a driver and a passenger are seated thereon.

The principal objects of this invention are therefore to provide an improved double seated saddle that shall have superior riding comfort under any condition of loading and which will be relatively simple and economical to manufacture.

These and other objects will become apparent from the following description taken in connection with the accompanying drawing in which:

Fig. 1 is a view of a longitudinal section through an exemplary double seat saddle according to the invention; and Fig. 2 is a bottom view of the saddle with the cover removed and parts broken away to show the construction.

Referring now to the drawing, the saddle comprises a metal frame 10 preferably formed of rectangular bar stock. The peripheral portions of the frame may be formed of one piece of bar stock as shown or may be formed of several sections suitably joined. The frame is shaped to have a relatively narrow forward end, the transverse portion 11 of which is substantially horizontal, and a relatively wide rear portion with a substantially horizontal transverse cantle portion 12. These are joined by longitudinal side member portions 13 and 14 positioned below the level of the front portion 11 and the cantle portion 12. The frame widens relatively quickly intermediately of its ends but the width of the intermediate portion is less than the width of the cantle portion. The side members 13 to 14 are joined by three transverse horizontal cross braces 15, 16 and 17. The brace 15 is located a short distance to the rear of the front end. The brace 16 is at the intermediate widening of the frame, and the brace 17 is close to and below the rear or cantle portion 12.

A mattress-like support for the seat cover is provided by the series of closely wound narrow coil springs 18 and 19. The forward set of springs 18 are stretched between the front transverse member 11, being hooked through a row of holes therein, and an intermediate transverse member 20. The rear set of springs 19 are stretched between the intermediate transverse member 20 and the cantle member 12. The member 20 is directly above the cross brace 16 and a pair of compression springs 21 of suitable resiliency are mounted between the cross brace 16 and the member 20. The springs 21 are preferably secured in place by bolts passing through eyes formed at both ends of the springs. Obviously if desired, one centrally positioned spring may be sufficient under certain conditions, or several lighter springs could be substituted.

To provide a comfortable seating surface the mattress of springs 18 and 19 is provided with a covering comprising a pad 22 of yieldable material such as hair felt or preferably sponge rubber. On the pad 22 is a top covering 23 of flexible sheet material such as coated fabric or leather. The covering is preferably secured to the frame 10 in a detachable manner as by hooks 24 secured to the peripheral edges of the top covering 23 and adapted to engage the edges of the frame members 11, 12, 13, and 14. If desired a back rest may be provided secured to the rear portion of the frame as shown at 25. Handles 26 may also be provided and secured to the rear portions of the side members 13 and 14. These are convenient for the use of the tandem passenger and also for use when pushing the motorcycle.

The double saddle is preferably resiliently mounted on the motorcycle and may be hingedly secured at the front and mounted on springs at the rear. The customary spring seat post or pillar may or may not be employed. In the embodiment illustrated, a portion of a motorcycle frame is shown at 27 having the customary type of vertically slidable spring-supported seat pillar 28 which is resiliently upwardly urged by a helical spring within the tubular vertical member of the frame 27. The pillar 28 is connected by linkage 29 to a fork 30 formed at the rear end of a longitudinal mounting bar 31 which has a fork 32 at its forward end. The bar 31 is secured centrally to the under sides of the crossbraces 15 and 16 in a suitable manner as by a bolt 33. The fork 32 is hingedly secured to an upward projection 34 of the frame 27. The spring seat pillar 28 is designed to support a single seated saddle and additional support is provided by a pair of compressible springs 35 secured between the rear cross brace 17 and a cross bar 36 secured to the top of the rear wheel fork portion 37 of the motorcycle frame 27 by hook bolts 38.

The action of the improved double seated saddle under the three different conditions of loading is as follows. When the rider alone sits on the forward portion of the saddle, the rear set of springs 19 is flat and free to permit forward movement of the member 20. This permits increased deflection of the forward set of springs 18. The springs 21 also provide their maximum resiliency in this condition of loading. The depression of the post 28 and the springs 35 are relatively moderate but add to the total resilience. If further softness of springing under this condition is desired, it can be readily obtained by disconnecting the linkage 29 so that only the rear springs 35 support the frame 10.

When the rider alone sits in the rear part of the saddle the added leverage causes greater depression of the seat pillar 28. The springs 18 are flat and thus permit a greater deflection of the rear set 19. The net result is that adequate softness of total resilience is obtained.

When the driver sits in the forward position and a passenger sits on the rear portion, the forward set of springs 18 and the rear set 19 will each be deflected to a somewhat lesser degree. The spring supported member 20 acts to prevent the rider and passenger from sliding toward the middle of the saddle. With the saddle fully loaded the seat post 28 and the springs 35 act cooperatively to provide the full desired resilience.

It will be understood that this invention is not limited to the exact details illustrated but various changes and modifications may be made without departing from the spirit and scope of the invention.

I claim:

1. In a cycle saddle the combination comprising a frame having front and rear transverse portions; a transverse member intermediate between said front and rear portions and freely moveable with respect to said frame; resilient seat supporting means stretched between said front transverse portion and said intermediate member; a second resilient seat supporting means stretched between said intermediate member and said rear transverse portion; a transverse brace secured to said frame and disposed below said intermediate member; and resilient means secured directly between said intermediate member and said transverse brace for resiliently urging said intermediate member upwardly.

2. An elongated cycle saddle comprising a peripheral frame having front and rear transverse portions and a transverse brace intermediate therebetween; a seat portion disposed in suspension between said front and rear transverse portions; means for hingedly mounting said front portion to a cycle frame; spring means connected between said rear portion and said cycle frame; and resilient means connected between said cycle frame and said transverse brace, said spring means and said resilient means cooperating additively to resiliently support said saddle on said cycle frame.

3. A cycle saddle as claimed in claim 2 in which said seat portion is provided with an intermediate transverse member disposed above said transverse brace and springs are connected between said intermediate member and said transverse brace.

HENRY MESINGER.